United States Patent [19]

Hawkes

[11] Patent Number: 4,648,651

[45] Date of Patent: Mar. 10, 1987

[54] COLLAPSIBLE SUPPORT WITH ARMRESTS

[75] Inventor: Peter C. Hawkes, Rugby, England

[73] Assignee: Andrews Maclaren Limited, Northampton, England

[21] Appl. No.: 744,553

[22] PCT Filed: Nov. 9, 1984

[86] PCT No.: PCT/GB84/00385

§ 371 Date: Jun. 12, 1985

§ 102(e) Date: Jun. 12, 1985

[87] PCT Pub. No.: WO85/02154

PCT Pub. Date: May 23, 1985

[30] Foreign Application Priority Data

Nov. 10, 1983 [GB] United Kingdom ............. 8329954

[51] Int. Cl.$^4$ .................. B62B 7/08; A47C 1/027
[52] U.S. Cl. .................. 297/45; 280/47.41; 297/27; 297/376
[58] Field of Search ............ 297/16, 19, 27, 375, 297/361, 364, 374; 280/647, 657, 658, 47.4, 47.41

[56] References Cited

U.S. PATENT DOCUMENTS

| 498,440 | 5/1893 | Marqua | 297/376 X |
|---|---|---|---|
| 2,195,091 | 3/1940 | Lorenz et al. | 297/27 |
| 2,549,902 | 4/1951 | Hibbard et al. | 297/376 X |
| 3,138,400 | 6/1964 | Reid | 297/19 |
| 3,504,926 | 4/1970 | Glaser . | |
| 4,072,318 | 2/1978 | Laune | 280/42 |
| 4,232,097 | 11/1980 | Maelarea | 280/650 X |
| 4,265,466 | 5/1981 | Kassai . | |
| 4,266,807 | 5/1981 | Griffin . | |
| 4,391,453 | 7/1983 | Glaser . | |
| 4,398,748 | 8/1983 | Duvignacq | 280/658 X |
| 4,462,607 | 7/1984 | Nakao et al. . | |

FOREIGN PATENT DOCUMENTS

| 68657 | 11/1975 | Australia . | |
|---|---|---|---|
| 0000437 | 1/1979 | European Pat. Off. . | |
| 3049060 | 7/1982 | Fed. Rep. of Germany . | |
| 777570 | 2/1935 | France | 297/19 |
| 1231771 | 10/1960 | France . | |
| 2318774 | 2/1977 | France . | |
| 2385363 | 10/1978 | France . | |
| 108697 | of 1917 | United Kingdom . | |
| 955126 | 4/1964 | United Kingdom . | |
| 1439942 | 6/1976 | United Kingdom . | |

Primary Examiner—Kenneth J. Dorner
Assistant Examiner—Peter R. Brown
Attorney, Agent, or Firm—Parkhurst & Oliff

[57] ABSTRACT

A collapsible, stick-folding, lie-back push-chair including seat support members having back rest members and armrest members, the inclination of the back rest members being controlled by connector members slidable along armrest members and having locking means in the form of a spring loaded pin for engagement with a hole in the armrest members. In the fully reclined position, the back rest members, and thus the seat, lie substantially parallel with the ground, at an angle of 165°–170° to the horizontal.

9 Claims, 4 Drawing Figures

1

COLLAPSIBLE SUPPORT WITH ARMRESTS

FIELD OF THE INVENTION

The invention relates to a collapsible support, for example a collapsible baby carriage such as a lie-back push chair, provided with armrests.

BACKGROUND ART

The specification of European Pat. No. 0 000 437 discloses a collapsible support, in the form of a lie-back push chair, comprising a rear frame having two upper corners and two lower corners; a base frame having two front corners and two rear corners pivotally connected, respectively, to the two lower corners of the rear frame; two upper brace members respectively pivoted, at their upper ends, to the upper corners of the rear frame; two lower brace members respectively pivoted, at their lower ends, to the front corners of the rear frame; two knuckle joints respectively connecting the two upper brace members to the lower brace members so as to prevent folding of the rear frame towards the base frame when the support is extended with the upper brace members respectively extending substantially colinearly with the lower brace members, but to allow the knuckle joints to move, respectively, towards the rear corners of the base frame; two seat support members having rear ends pivotally connected, respectively, at or adjacent the rear corners of the base frame and having front ends respectively supported by the two lower brace members; and two backrest members having lower ends respectively pivoted to the seat support members.

DISCLOSURE OF THE INVENTION

It is intended, by means of the present invention, to provide a collapsible support with armrests which are not only collapsible with the remainder of the structure, but which also serve to carry out functions normally carried out by other components, thus (to this extent) simplifying the structure.

This is achieved by providing two armrest members having rear ends pivotally connected to the rear frame at positions respectively above the rear ends of the two seat support members and having front ends which project beyond the lower brace members when the support is extended; two links having upper and lower ends respectively pivoted to the armrest members and the seat support members so that each link, and the seat support and armrest members to which the link is pivoted, form part of a parallelogram linkage; two connector members respectively slidable along the armrest members and respectively slidable along the backrest members so as to vary the inclination of the backrest members when the support is extended; and locking means for locking the connector members respectively so as to support the backrest members in at least one position.

The armrest members are therefore capable of being folded so as to lie alongside the rear support members, by virtue of the parallelogram linkages of which they form parts. In addition, compact connector members, with their locking means, co-operate with the armrest members and the backrest members to provide support for the backrest members.

In a preferred embodiment of the invention the armrest members are respectively provided with hooks which, when the support is in its extended condition, respectively engage the lower brace members so as to provide lateral support for the armrest members. The two links extending between the seat support members and the armrest members are therefore relieved of lateral mechanical loading and serve to complete parallelogram linkages for controlling folding of the armrest members with the remainder of the structure. The links can therefore be provided in the form of relatively lightweight members.

The rear frame can be provided in a form such that, when the structure is in its extended condition, there is a space through which the backrest members can swing during variation in the inclination of the backrest members. The rear frame may also include means for supporting the backrest members when they are in their fully inclined position.

The rear and base frames may both be rigid structures, for example: rectangular in shape, so that collapsibility is effected merely by hinged movement of the rear and base frames towards each other. In this case, the seat support members may be provided with supports which permit movement between the seat support members and the lower brace members during folding movement of the structure into and out of its extended condition. Both the seat support members and the armrest members can be used to lock the structure in its extended condition.

In an alternative form of construction, both the rear and base frames may be laterally collapsible and, in a preferred form of construction, the base frame is an X-frame having two pivotally interconnected crossmembers.

Embodiments of the invention are hereinafter described, by way of example, with reference to the accompanying drawings.

MODES FOR CARRYING OUT THE INVENTION

Figure 1:
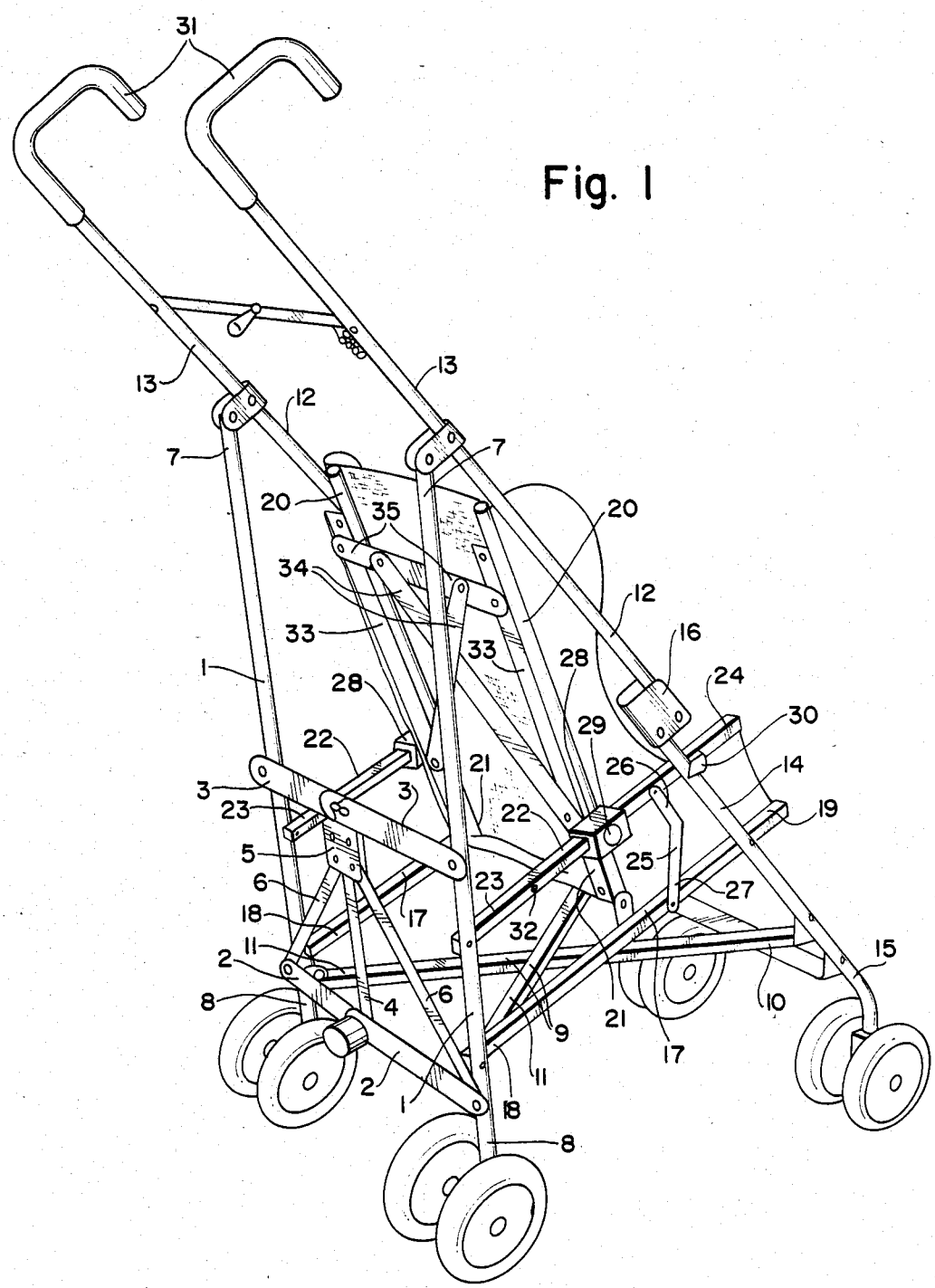
FIGS. 1 and 2 are respectively perspective and side views of collapsible, stick-folding lie-back push chairs provided with armrests in accordance with the present invention.
Figure 2:
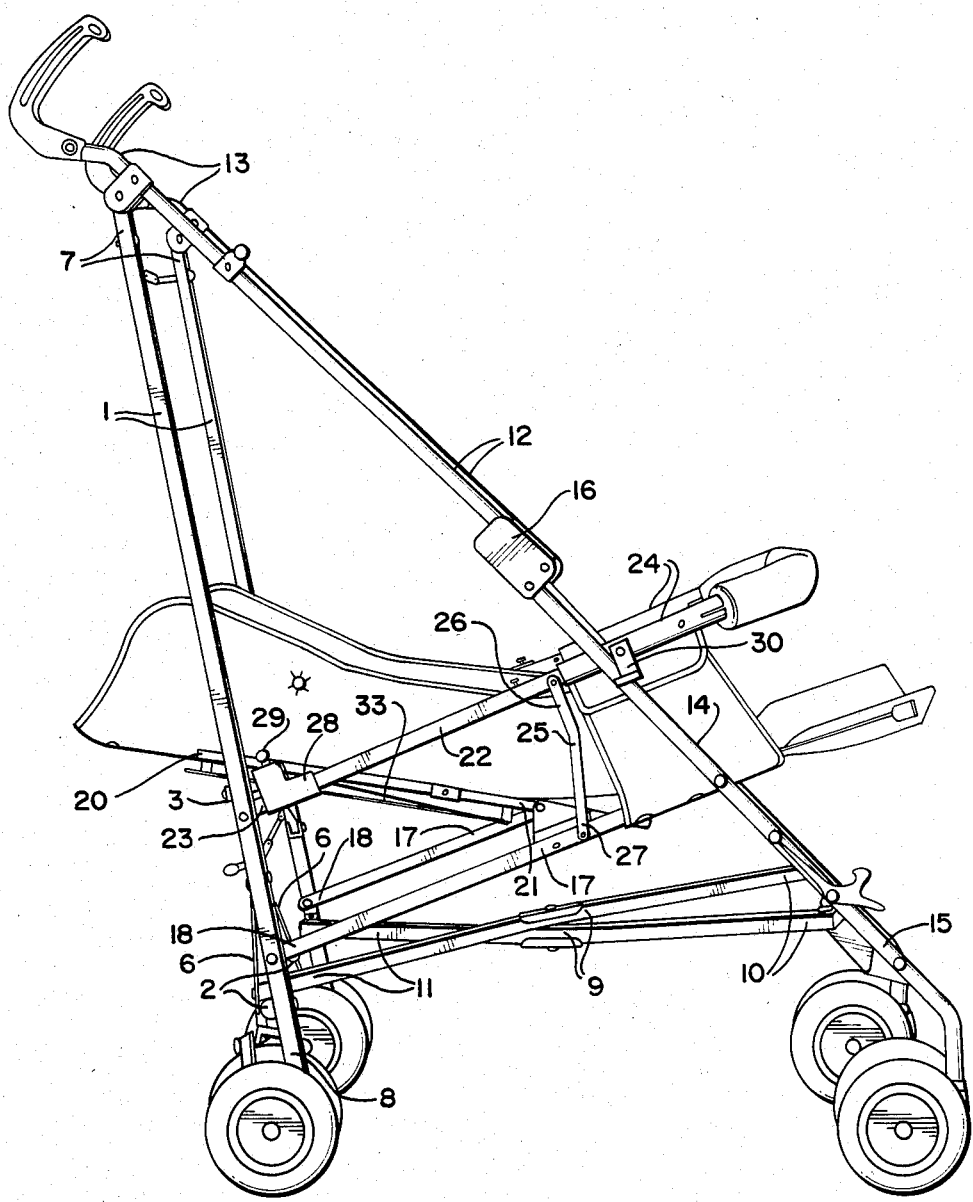

The collapsible, stick-folding, lie-back push chairs shown in FIGS. 1 and 2 have a rear frame comprising two rear legs 1 interconnected by two first over-centre locking toggle links 2 and two second over-centre locking toggle links 3 which are interconnected by a connector rod 4. A slide 5 is supported for movement relative to the connector rod 4 by means of two support rods 6.

The base frame comprises two cross-members 9 which are interpivoted to form an X-frame having rear corners 11 which are pivotally connected to the rear legs 1 at the lower corners 8 of the rear frame.

Upper brace members 12, bearing handles 31, are pivotally connected at their upper ends 13 to the back legs 1 at the upper corners 7 of the rear frame and lower brace members 14 are pivotally connected at their lower ends 15 to the front ends 10 of the base frame.

Knuckle joints 16 connect the two upper brace members 12 to the two lower brace members 14 and seat support members 17 are pivotally connected, at their rear ends 18, to the rear legs 1, adjacent the lower corners 8 of the rear frame. The seat rest members 17 are also connected, at their front ends 19, to the lower brace members 14 so that on articulation to cause lateral collapse of the rear and base frames, the knuckle joints 16 move towards the rear corners 11 of the base frame and the rear frame swings over towards the base frame.

As shown, backrest members 20 are pivoted, at their lower ends, for swinging movement relative to the seat support members 17, and the inclination of the backrest members 20 is controlled by connector members 28 slidable along armrest members 22 having rear ends 23 pivotally connected to the rear legs 1 at positions above the rear ends 18 of the seat rest members 17.

Links 25 each have upper and lower ends 26 and 27 respectively pivoted to an armrest member 22 and a seat rest member 17 to form a parallelogram linkage which, when the push chair is collapsed permits the armrest member 22 to assume a position alongside the seat support member 17. The front end 24 of each armrest member 22 is provided with a hook 30 which engages the outer surface of the adjacent lower brace member 14 when the push chair is in its extended condition so as to locate the lower brace member 14 between the armrest member 22 and the hook 30, thus permitting the link 25 to be a lightweight element.

Each connector member 28 comprises a plastic sleeve slidable on an armrest member 22 and fitted with locking means in the form of a spring-loaded pin 29 for engagement with hole 32 in the armrest member 22 along which the connector member 28 slides. Each connector member 28 is also provided with an inwardly directed projection which extends between the adjacent backrest member 20 and a backrest side member 33 which together with cross members 34 and connector links 35, form a laterally collapsible backrest frame.

Therefore, on withdrawing the spring loaded pins 29 from the holes 32 and moving the connector members 28 in unison along the armrest members 22, the backrest members 20 are caused to rotate from one inclination to another and can be locked in this other inclination if the armrest members 22 are provided with additional holes so that there is a series of holes receiving the spring loaded pins 29.

Figure 3:
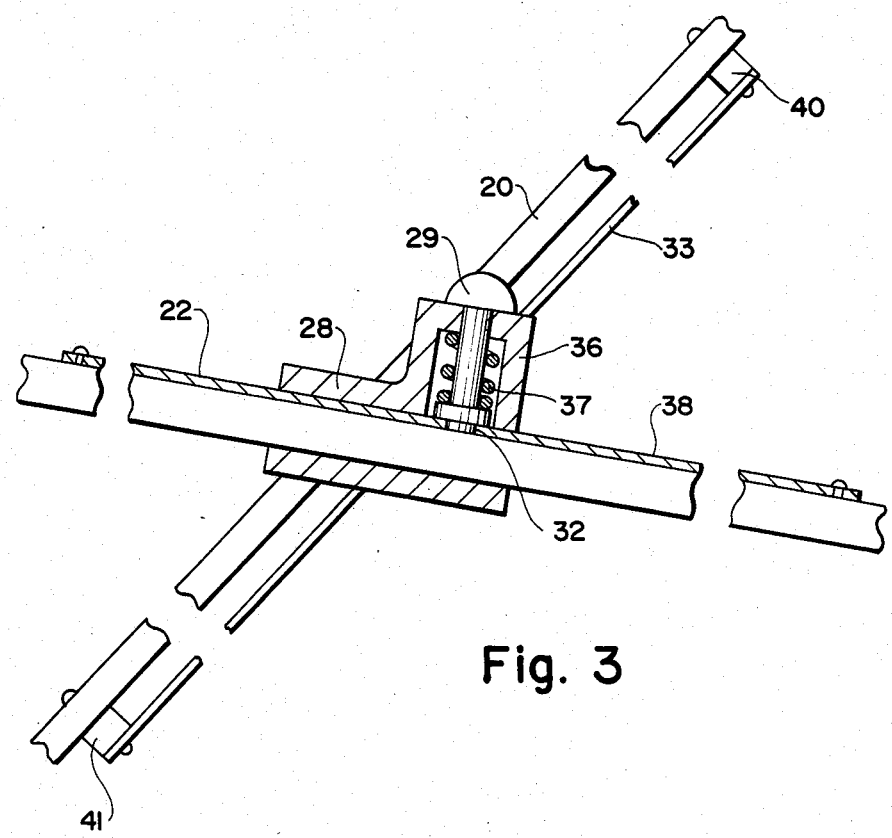
FIG. 3 is a part-sectional schematic side elevation of part of the support shown in FIG. 2, showing the connector member thereof.
Figure 4:
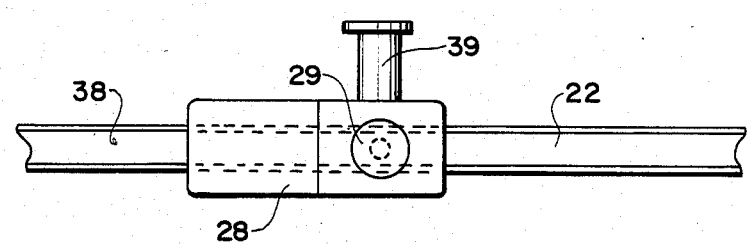
FIG. 4 is a plan view of the connector member shown in FIG. 3.

In the locking member of the FIG. 2 support, shown in detail in FIGS. 3 and 4, the locking means comprise a pin 29 supported in an upstanding portion 36 of the plastic connector member 28 and a spring 37 urges the pin 29 into a hole 32 formed in a metal strap 38 attached to the armrest member 22.

As shown in FIG. 4, the connector member 28 has an inwardly directed projection 39 which extends between the adjacent backrest member 20 and its backrest side member 33. As shown, the backrest side member 33 is held away from the backrest member by spacers 40, 41.

In every embodiment, the seat is reclinable, with the armrests to a substantially horizontal position, in the preferred embodiments between 165°–170°, in other words so that the back-rest members 20 lie substantially parallel to the ground.

I claim:

1. A collapsible support, for example a collapsible baby carriage, comprising:

a rear frame having two upper corners and two lower corners;

a base frame having two front corners and two rear corners pivotally connected, respectively, to the two lower corners of the rear frame;

two upper brace members respectively pivoted, at their upper ends to the upper corners of the rear frame;

two lower brace members respectively pivoted, at their lower ends, to the front corners of the base frame;

two knuckle joints respectively connecting the two upper brace members to the two lower brace members so as to prevent folding of the rear frame towards the base frame when the support is extended with the upper brace members having a longitudinal axis extending substantially parallel with the lower brace members, but which allow the upper and lower brace members to fold, respectively, towards the rear corners of the base frame;

two seat support members having rear ends pivotally supported, respectively, at or adjacent the rear corners of the base frame and having front ends respectively supported by the two lower brace members;

two backrest members having lower ends respectively pivoted to the seat support members;

two armrest members having rear ends pivotally connected to the rear frame at positions respectively above the rear ends of the two seat support members and having front ends which project beyond the lower brace members when the support is extended;

two links having upper and lower ends respectively pivoted to the armrest members and the seat support members;

two connector members respectively slidable on the backrest members and respectively slidable on the armrest members so as to allow adjustment of the inclination of the backrest members when the support is extended; and locking means for locking the connector members, on the respective armrests, so as to support the backrest members in at least one position.

2. A collapsible support according to claim 1, in which the armrest members are respectively provided with hooks which, when the support is extended, respectively engage the lower brace members so as to provide lateral support for the armrest members.

3. A collapsible support according to claim 2, in which the lower brace members are respectively engaged between the armrest members and the hooks.

4. A collapsible support according to claim 1, in which the connector members each comprise a sleeve slidable longitudinally of an associated armrest members.

5. A collapsible support according to claim 4, in which the locking means comprise a spring-loaded pin cooperable with a hole associated with the arm-rest.

6. A collapsible support according to claim 5, in which the connector members each comprising an upstanding portion housing the pin and a spring.

7. A collapsible support according to claim 6, in which the hole is formed in a strap carried by the armrest.

8. A collapsible structure according to claim 5, in which the hole is one of a series of holes.

9. A collapsible structure according to claim 4, in which the sleeves are plastic.

* * * * *